United States Patent
Willey

[19]

[11] Patent Number: 5,901,351
[45] Date of Patent: May 4, 1999

[54] METHOD AND APPARATUS FOR DETECTION OF FRAUDULENT USERS IN A COMMUNICATION SYSTEM USING SIGNALING-CHANNEL PHASE SHIFT

[75] Inventor: W. Daniel Willey, Arlington Heights, Ill.

[73] Assignee: Motorola, Inc., Schuamburg, Ill.

[21] Appl. No.: 08/651,230

[22] Filed: May 22, 1996

[51] Int. Cl.[6] .................................................. H04M 1/66
[52] U.S. Cl. ........................ 455/410; 455/67.1; 375/340
[58] Field of Search .................................... 455/410, 411, 455/67.1, 132, 517; 380/23; 340/825.3, 825.31, 825.34; 370/514; 371/53, 55, 47.1, 48, 57.2, 61, 67.1; 375/224, 225, 282, 333, 340, 360, 361

[56] References Cited

U.S. PATENT DOCUMENTS

| | | | |
|---|---|---|---|
| 4,169,245 | 9/1979 | Crom et al. ............................. | 455/132 |
| 4,268,722 | 5/1981 | Little et al. . | |
| 4,654,867 | 3/1987 | Labedz et al. . | |
| 4,984,290 | 1/1991 | Levine et al. . | |
| 5,274,368 | 12/1993 | Ereeden et al. ......................... | 455/410 |
| 5,420,910 | 5/1995 | Rudokas et al. ....................... | 455/410 |
| 5,448,760 | 9/1995 | Frederick ............................... | 455/67.1 |
| 5,467,382 | 11/1995 | Schorman .............................. | 455/410 |
| 5,655,013 | 8/1997 | Gainsboro .............................. | 379/188 |
| 5,734,684 | 3/1998 | Matsui ................................... | 375/340 |

*Primary Examiner*—Nguyen Vo
*Assistant Examiner*—Sam Bhattacharya
*Attorney, Agent, or Firm*—Richard A. Sonnentag; Kenneth A. Haas

[57] ABSTRACT

A method and apparatus for fraud detection is provided in which a remote unit within a communication system (100) transmits a Digital Supervisory Audio Tone (DSAT) at a transmission rate with a known maximum phase shift over time. When a fraudulent remote unit hijacks a traffic channel within the communication system (100), fraud detection is accomplished by calculating a maximum permitted (DSAT) phase shift (630) and determining if the reacquired DSAT has a phase shift greater than a permitted DSAT phase shift (635). When a reacquired remote unit's DSAT phase shift is greater than a permitted DSAT phase shift, appropriate fraud control methods are performed (640).

18 Claims, 5 Drawing Sheets

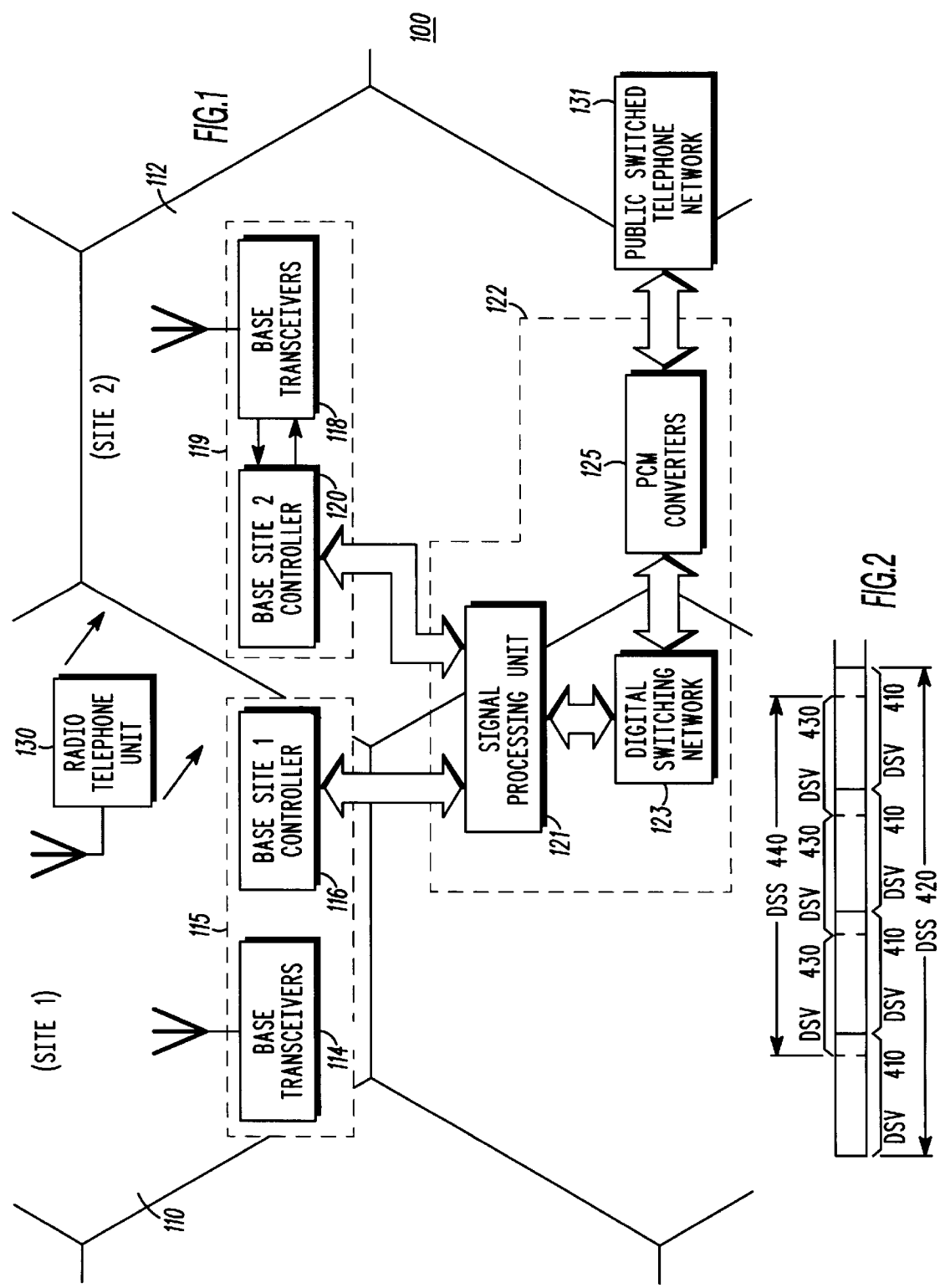

METHOD AND APPARATUS FOR DETECTION OF FRAUDULENT USERS IN A COMMUNICATION SYSTEM USING SIGNALING-CHANNEL PHASE SHIFT

FIELD OF THE INVENTION

The present invention relates generally to cellular communication systems and, in particular, to detection of fraudulent users in cellular communication systems.

BACKGROUND OF THE INVENTION

Communication systems are known to comprise a plurality of base sites that provide communication services to remote units located in corresponding service coverage areas of the base sites. One known communication system is a cellular communication system, such as the Narrowband Advanced Mobile Phone Service (NAMPS). In an NAMPS system, a remote unit (e.g., a mobile or stationary remote unit) that desires to communicate, sends a channel request signal and identification (ID) information to a base site serving the coverage area in which the remote unit resides. Upon receiving the remote unit's ID and channel request signal, the serving base site allocates a communication resource for the remote unit. The communication resource comprises a coordinated pair of frequencies (i.e., an uplink frequency and a downlink. frequency sometimes referred to as voice or traffic channels). In a communication system employing a Time Division Multiple Access (TDMA) protocol, the communication resource comprises a coordinated pair of time slots and frequencies (i.e., a first time slot at an uplink frequency and a second time slot at a downlink frequency). The uplink frequency supports transmissions from the remote unit to the serving base site, whereas the downlink frequency supports transmissions from the serving base site to the remote unit.

Upon allocating the communication resource, the base site sends a channel designation signal containing the uplink and downlink frequency, to the remote unit via a control channel. Upon receiving the channel designation signal, the remote unit tunes its transmitter and receiver to the designated frequencies and begins communicating with a telephone network subscriber or another remote unit via the serving base site. The serving base site then tracks billing information regarding the call, and utilizing the remote unit's ID, charges the appropriate fees to the corresponding caller.

During communication with the base station, a fraudulent remote unit (i.e., a fraudulent user operating a remote unit) can hijack a voice channel by transmitting on the corresponding uplink frequency at a high enough power level, causing the legitimate remote unit to be abandoned in favor of the fraudulent remote unit. Once communication has been established between the fraudulent remote unit and the communication system, the fraudulent remote unit may then utilize three-party calling features of the communication system to place other calls utilizing the legitimate remote unit's ID, causing associated fees to be charged to the legitimate remote unit.

Thus a need exists for a method and apparatus for detection of fraudulent users in a communication system.

BRIEF DESCRIPTION OF THE DRAWINGS

FIG. 1 is a cellular communication system in accordance with a preferred embodiment of the present invention.

FIG. 2 illustrates a Digital Supervisory Vector (DSV) and Digital Supervisory Signal (DSS) in accordance with a preferred embodiment of the invention.

DETAILED DESCRIPTION OF THE DRAWINGS

Figure 3:
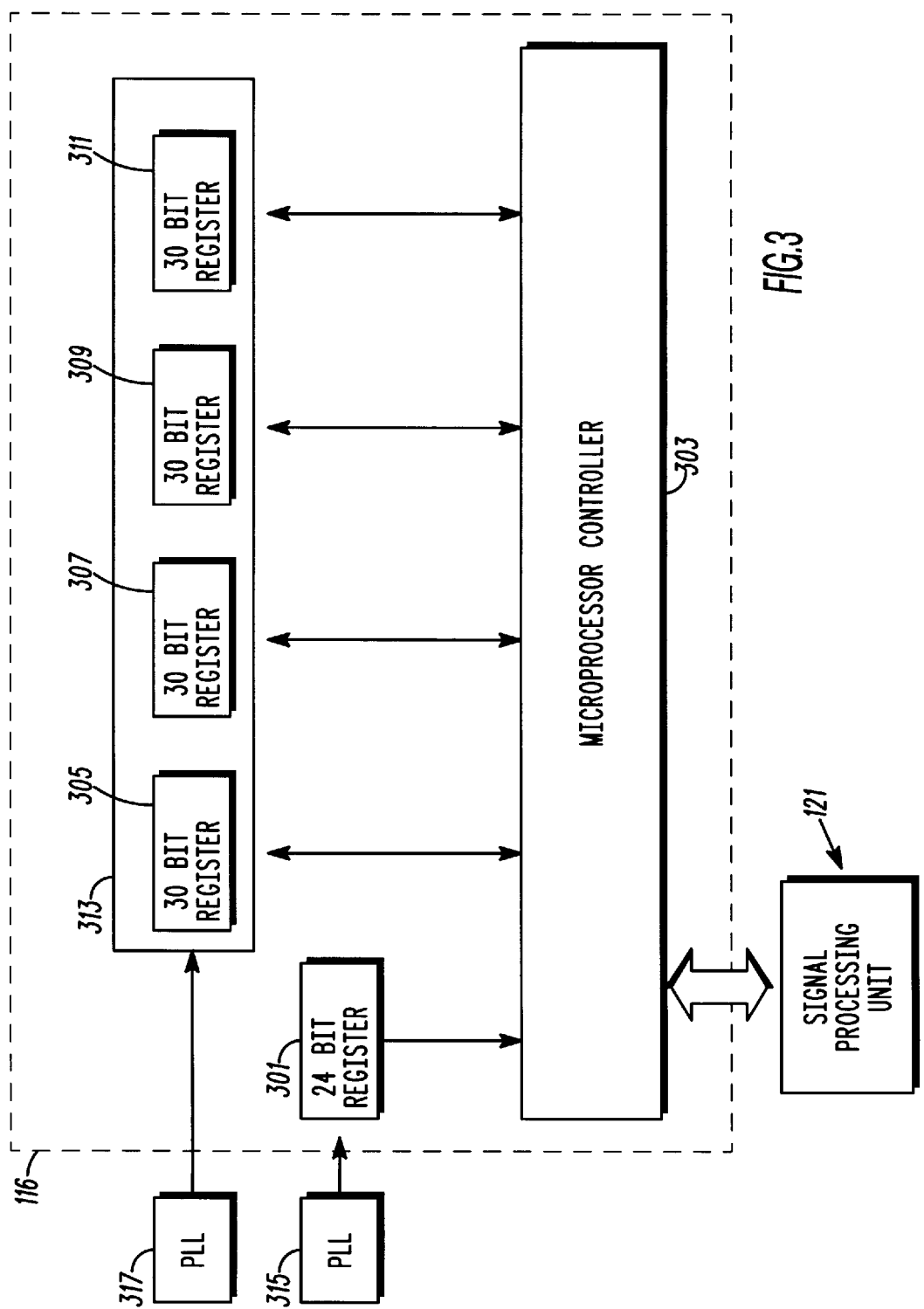
FIG. 3 is a base site controller of FIG. 1 in accordance with a preferred embodiment of the present invention.

Stated generally, a method and apparatus for fraud detection is provided in which a remote unit within a communication system transmits a digital signal (in a preferred embodiment the digital signal is a Digital Supervisory Audio Tone (DSAT)) at a transmission rate with a known maximum phase/bit shift over time. When a fraudulent remote unit hijacks a traffic channel within the communication system, fraud detection is accomplished by calculating a maximum permitted (DSAT) phase shift and determining if the re-acquired DSAT has a phase shift greater than a permitted DSAT phase shift. When a reacquired remote unit's DSAT phase shift is greater than a permitted DSAT phase shift, appropriate fraud control methods are performed.

The present invention encompasses a method for detection of fraudulent users in a communication system comprising the steps of communicating within the communication system on a first channel and detecting a phase shift within the first channel. A permitted phase shift is determined and compared to the detected phase shift. Finally, fraud control is performed based on the comparison.

An alternate embodiment of the present invention encompasses a method for detection of fraudulent users in a communication system comprising the steps of communicating with a first remote unit on a first channel and communicating with a second remote unit on the first channel causing communication with the first remote unit to be discontinued. A phase shift is detected between the first remote unit and the second remote unit. This phase shift is compared to a permitted phase shift and fraud control is performed based on the comparison.

Yet another embodiment of the present invention encompasses a communication system comprising a first remote unit communicating on a first channel, a second remote unit communicating on the first channel, and a microprocessor controller for detecting a phase shift between the first remote unit and the second remote unit, said microprocessor controller comparing the phase shift to a permitted phase shift and performing fraud control based on the comparison.

A cellular communication system 100 in accordance with a preferred embodiment of the invention is shown in FIG. 1. In a preferred (embodiment communication system 100 preferably utilizes an NAMPS protocol, but other system protocols (such as the Advanced Mobile Phone Service (AMPS) protocol, the Personal Digital Cellular (PDC) protocol, the United States Digital Cellular (USDC) protocol, or the Code Division Multiple Access (CDMA) protocol.) may be used as well. Communication system 100 includes cell site equipment 115 and 119 for two geographic radio frequency (RF) coverage areas (cells) 110 and 112, respectively. For cell 110, cell site equipment 115 includes a set of base transceivers 114 and base site controller 116. For cell 112, cell site equipment 119 includes a set of base transceivers 118 and base site controller 120 with substantially identical circuitry as cell site equipment 115.

Overall control of cell site equipment 115 and 119 is provided by signal processing unit 121 of cellular switch controller 122. Switch controller 122 also includes digital switching network 123 for controlling the call switching operation between public switched telephone network (PSTN) 131 and cell site equipment 115 and 119. A set of pulse code modulation (PCM) converters 125 are included in cellular switch controller 122 for interfacing communication system 100 to PSTN 131. Reference may be made to "Cellular Voice and Data Remote Unit System," Labedz at. al., U.S. Pat. No. 4,654,867. For further details of a conventional cellular switch controller, reference may be made to U.S. Pat. No. 4,268,722, Little et. al. Both of the above U.S. patents are assigned to the assignee of the present invention and incorporated herein by reference.

In a preferred embodiment, communication system 100 utilizes a signaling channel comprising a Digital Supervisory Audio Tone (DSAT) (sometimes referred to as a Digital Sub-Audible Tone) digital signaling system as described in U.S. Pat. No. 4,984,290, Levine et. al. and assigned to the assignee of the present invention. Although a description of a preferred embodiment is given below with respect to acquisition of a DSAT, one of ordinary skill in the art will recognize that acquisition of other signals may be substituted (Digital Supervisory Vectors, Digital Supervisory Sequences, or Digital Signaling Tones for example) without varying from the present invention. The signaling system preferably utilizes a combination of 100 bits per second (BPS) Manchester data and 200 BPS restricted non-return-to-zero (NRZ) data transmission. Signaling is transmitted continuously along with the speech on the voice channel at a sub-audible range, thereby not requiring audio muting for transmitting data message bursts.

Prior to describing a preferred embodiment, the following definitions set out necessary background language:

Digtal Supervisory Vector (DSV)—a fixed-length digital word, including any cyclic shift of any fixed length digital word; DSVs;

Digital Supervisory Sequence (DSS)—a plurality of continuous DSVs;

Digital Supervisory Audio Tone (DSAT)—a plurality of continuously transmitted DSSs;

Cross Distance: the Hamming distance from any one DSV or a cyclic shift thereof to a different DSV;

Auto Distance: the Hamming distance between a DSV pattern and any cyclic shift thereof.

FIG. 2 illustrates an example of the above defined DSV and DSS. A plurality of continuous DSVs 410 comprising single DSS 420 is shown. Additionally, an alternate cyclic shift of DSVs 410 is shown as DSVs 430, wherein DSVs 430 comprise DSS 440 which is identical to DSS 420. A set of 14 DSV patterns (including respective inverses, commonly known as Digital Signaling Tones (DSTs)) plus a compatible word sync correlation pattern have been identified according to a preferred embodiment of the present invention. The DSV set shown below (in hexadecimal form) consists of seven 24 bit DSV patterns (vectors 1–7) plus their inverses (vectors 8–14).

vect(1)=2556 cb
vect(2)=255b2b
vect(3)=256a9b
vect(4)=25ad4d
vect(5)=26ab2b
vect(6)=26b2ad
vect(7)=2969ab
vect(8)=daa934
vect(9)=daa4d4
vect(10)=da9564
vect(11)=da52b2
vect(12)=d954d4
vect(13)=d94d52
vect(14)=d69654

The description of a preferred embodiment of the present invention will be outlined in three parts, covering:
1. DSS & DSV preferred properties;
2. Acquiring a DSAT; and
3. Fraud detection utilizing DSAT phase shift.

DSS & DSV PREFERRED PROPERTIES

DSSs preferably consist of continuous transmission of one of seven DSV patterns or their logical inverses (each DSV and its logical inverse corresponds to the identity of one cell site). In a preferred embodiment, inverted DSVs are used to signal only on the reverse voice channel, i.e., communications from the remote unit to the base site. Thus, the detection of the inverted DSV is not required in the remote unit. In a preferred embodiment DSVs comprise the following nine properties:

Property 1: A DSV consists of 24 NRZ bits transmitted at 200 BPS to provide a maximum number of uncorrelated samples to the receiver for better noise immunity. It is worth noting that one could also use 100 BPS data stream and then Manchester modulate to provide the 200 "BPS" data with the necessary low frequency spectrum restrictions. However, transmitting at 200 BPS NRZ is preferred. With some restrictions this scheme allows many non-Manchester patterns to be used, which provides a substantial increase in information transfer. That is, a greater number of DSVs are allowed from which to select, which translates into a DSV set with greater auto and cross distances.

Property 2: All cyclic shifts of each DSV can be detected. This allows the receiver to start detection of a DSS during any phase of a DSV starting at any point of a DSS, thereby improving both DSS acquisition time and receive sensitivity. Thus, a unique and distinct DSS can be detected after any 24 bits the DSS are received without ever having to wait for particular phase (cyclic shift) of a DSV to begin. This imposes a preferred restriction that there be a minimum "auto distance" between all cyclic shifts of a DSV. In a preferred embodiment, the current criteria for 24 sample sequences is a minimum auto distance of 8. Additionally, the DSS does not need to be thought of as a series of DSV words, but as a continuous bit sequence which can be operated on over any length of bits.

Property 3: There must be a minimum cross distance between all DSVs employed. In a preferred embodiment, the criteria for a 24 bit DSV is a minimum cross distance of six.

Property 4: All cyclic shifts of each DSV and their inverse, preferably have a minimum Hamming distance from all 100 BPS random Manchester data words sampled at 200 samples per second. This distance is herein after referred to as the minimum random Manchester distance. Minimum random Manchester distance is preferably maintained for either phase of the Manchester data. This criteria greatly improves the falsing protection against the Manchester data messages of a cochannel interferer. Without this requirement, data message falsing would be more prevalent because the falsing protection is based upon the number of bits of the interfering Manchester data word instead of the number of uncorrelated samples. This criteria therefore allows for the use of shorter DSVs with much improved data falsing protection.

Property 5: The DSV should not have more than two consecutive ones or zeros in order to minimize low frequency content.

Property 6: An integration of a DSV starting from bit 1 to bit 24 (cumulative DC bias) should have an absolute value of 3 or less.

Property 7: Each DSV should have a zero DC bias over the entire pattern.

Property 8: In certain exceptional instances, the auto distance can go to zero before the 24 cyclic shifts.

Property 9: The number of transitions should be maximized for improved phase looked loop (PLL) performance for the remote unit circuits and the base site equipment.

DSSs should be detected independent of sequence phase for minimum acquisition time. That is, all phases of the DSV should be detectable. In addition lo decreasing DSS acquisition time, detect sensitivity is improved.

Acquiring a DSAT

DSATs are acquired by the base site whenever the remote unit switches to a voice channel (for example, to make a call or after a handoff), or after the remote unit has been muted for 4.5 seconds. DSATs are transmitted at 200 BPS to provide a maximum number of uncorrelated samples for better noise falsing performance, and to provide the greatest distance properties between DSAT sequences over the shortest time interval. As discussed previously, there is a minimum distance between all cyclic shifts of a DSAT sequence. This allows the DSAT data stream to be analyzed beginning at any bit and not just at DSAT "word" boundaries. Thus, the DSAT acquisition scheme can continuously check for a DSAT, allowing for faster acquisition and greater sensitivity due to increased number of valid DSAT phases.

Acquisition of a DSAT can better be illustrated with reference to FIG. 3. Base site controller 116 comprises 24 bit register 301, microprocessor controller 303, and first leg 313 of 30 bit registers 305–311. As shown, 24 bit register 301 is coupled to PLL 315 (originating from base transceiver 114), 30 bit register 305 is coupled to PLL 317 (originating from base transceiver 114), and microprocessor controller 303 is coupled to signal processing unit 121. Operation of base site controller 116 occurs as follows: During "initial DSAT detect" received DSAT bits from PLL 315 (transmitted at 200 BPS and received by base transceiver 114, enter 24 bit register 301. Microprocessor controller 303 compares the 24 bit DSAT sequence assigned to the current cell to the received bits, and if there are one or fewer bit errors, then an "initial DSAT detect" has occurred. If more than one bit error has occurred, then microprocessor controller 303 rotates the DSAT sequence and again compares the cell's DSAT sequence to the received DSAT existing within 24 bit register 301. In other words microprocessor controller 303 utilizes a "multiple phase DSAT detection scheme" by "walking through" all possible DSVs. If microprocessor controller 303 "walks through" all 24 possible DSVs and does not find a match with the value in 24 bit register 301, the process restarts when a new bit is shifted from the PLL into 24 bit register 301. When a match is found, microprocessor controller 303 copies the bit values from 24 bit register 301 into the most 24 recent bit positions of 30 bit register 305. Microprocessor controller 303 also copies the DSV with which a match was found into the most recent 24 bits of 30 bit register 309.

When subsequent bits are received from the remote unit, microprocessor controller 303 will update the most recent bit in 30 bit register 309 with the next bit in the DSS. In addition, microprocessor controller 303 will shift the oldest bit in 30 bit register 309 into the newest bit position of 30 bit register 311. Thus 30 bit registers 309 and 311 will contain a portion of a DSS while 30 bit registers 305 and 307 contain bits received from the PLL. By comparing the values contained in 30 bit registers 305 and 307 with the values contained in 30 bit registers 309 and 311, microprocessor controller 303 can determine whether or not a subscriber unit's DSAT is detected. After a "confirmed DSAT detect" has occurred, microprocessor controller 303 utilizes a "single phase DSAT detection" scheme where the received values in 30 bit registers 305 and 307 are only compared to the single bit sequence contained in 30 bit registers 309 and 311 rather than multiple possible DSV bit sequences. In other words, a single phase DSAT detection scheme checks for only the single expected DSAT by the received values in registers 303 and 307 are compared only to the bit sequences in registers 309 and 311.

After "initial DSAT detect", microprocessor controller 303 adjusts PLL 317 so that its timing matches that of PLL 315. Microprocessor controller 303 then waits until six more bits have been shifted into 30 bit register 305. (Note that the same six bits will be shifted into 24 bit register 301). Meanwhile six more expected DSS bits have been shifted into 30 bit register 309. Microprocessor controller 303 then compares the most recent six bits from 30 bit register 305 to the most recent six bits from 30 bit register 309. If there are zero bit errors then a "confirmed DSAT detect" has occurred. Otherwise the DSAT acquisition process starts over looking for an "initial DSAT detect."

When a fraudulent remote unit hijacks a channel that is locked to a legitimate remote unit's DSAT, bit errors can quickly put microprocessor controller 303 into a state of no detect. In a preferred embodiment, the state of no detect occurs when a comparison of the bits in register 305 to the bit sequence in register 309 yields a number of bit errors that is greater than three but less than 27, and a comparison of the bits in register 307 to the bit sequence in register 311 yields a number of bit errors that is greater than three but less than 27. The state of no detect occurs because the fraudulent remote unit has a high probability of transmitting the DSAT out of phase. In other words, there exists a probability of a timing difference (shown as $\Delta t$ in FIG. 4) in DSAT transmission between the fraudulent and non-fraudulent remote units. After a short time of trying to acquire the fraudulent remote unit's DSAT with the single phase DSAT detection scheme, microprocessor controller 303 will try to acquire the fraudulent remote unit's DSAT with the multiple phase DSAT detection scheme. The fraudulent remote unit's DSAT will quickly be re-acquired.

Figure 4:
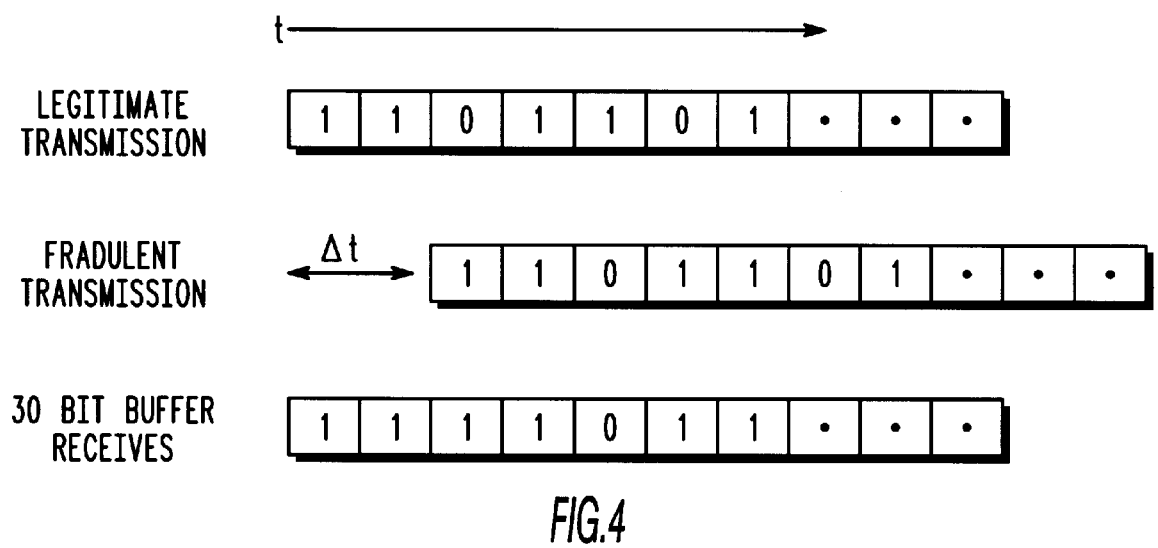
FIG. 4 illustrates transmission of a fraudulent digital supervisory audio tone (DSAT).

An example of reception of a fraudulent DSAT transition is illustrated in reference to FIG. 4. As can be seen in FIG. 4, a fraudulent transmission begins two time slots off phase with the legitimate DSAT transmission. Bit errors (shaded time slots within the 30 bit buffer 313 begin to accumulate which put microprocessor controller 303 into a state of no detect. Eventually microprocessor controller 303 will re-acquire the DSAT transmitted by the fraudulent remote unit by utilizing a multiple phase DSAT detection scheme.

Fraud Detection Utilizing DSAT Phase Shift

According to current NAMPS specifications, a remote unit must transmit a DSAT at a rate of 200+/−0.2 NbRZ BPS. Because of this, a DSAT will shift in phase no more than one bit in five seconds. Therefore, if the DSAT phase has shifted more than one bit when re-acquired (typically after around five seconds), there is a chance that a fraudulent remote unit has accessed the cellular system. Since a loss of a DSAT is typically declared after 10 seconds, the worst possible bit shift before reacquisition of a DSAT is 2 bits. Thus, a worst case fraud detection rate would be (24−5)/24=79% of all hijacks detected. This can be improved by re-acquiring a DSAT more quickly from the time it was lost. In a preferred embodiment, this is accomplished by running the multiple phase DSAT detection scheme at the same time the single phase DSAT detection scheme is run in order to try to detect the fraudulent remote unit's DSAT phase shift as soon as possible. If the time between loss of a DSAT and re-acquisition is small, the hijack detection rate can approach 100%.

Figure 5:
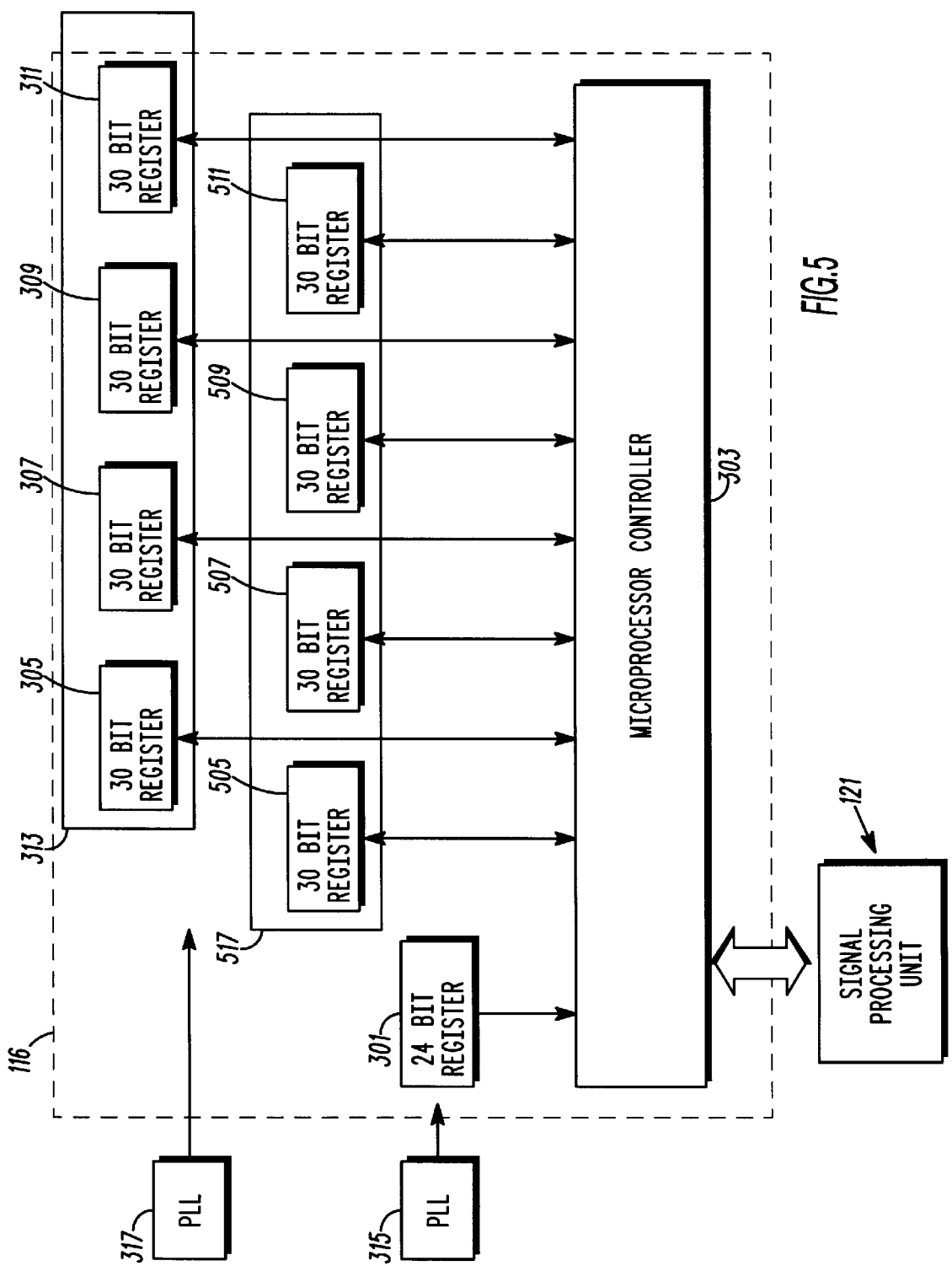
FIG. 5 is a base site controller of FIG. 1 in accordance with an alternate embodiment of the present invention.

FIG. 5 illustrates a base site controller 116 of FIG. 1 in accordance with a preferred embodiment of the present invention. Note that the base site controller 116 shown in FIG. 5 is identical to the base site controller 116 of FIG. 3 with the addition of second leg 517 of four 30 bit registers 505, 507, 509, and 511 which are coupled to microprocessor controller 303 and are used in a similar manner as first leg 313 of 30 bit registers 305, 307, 309, and 311. As shown, second leg 517 has an input originating from the PLL 315.

Operation of base site controller 116 occurs as follows: After a "confirmed DSAT detect" has occurred, a single phase DSAT detection scheme (as described above) will proceed using PLL 317 and first leg 313. PLL 315 which is input to 24 bit register 301 and second leg 517 will then be decoupled from the single phase DSAT detection scheme which is utilizing PLL 317 and first leg 313. Whenever the single phase DSAT detection scheme goes into a stats of no detect, PLL 317 will run free at 200 BPS with PLL 315 locking to the input signal (which could potentially be the signal of a hijacking remote unit). Microprocessor controller 303 will execute a multiple phase DSAT detection scheme using 24 bit register 301 and confirm the DSAT detection using second leg 517 at the same time single phase DSAT detection scheme is occurring with first leg 313. If an "initial DSAT detect" is observed using 24 bit buffer 301, microprocessor controller 303 will attempt to confirm the DSAT detection with second leg 517 as described above. The 24 bit value from 24 bit register 301 will be copied into the most recent bit positions of 30 bit register 505. The matched DSV will be copied into the most recent 24 bits of 30 bit register 509. An additional six bits will be clocked into both 30 bit register 305 and 24 bit register 301. Meanwhile, register 509 is updated with the next six bits in the DSS. Next, microprocessor controller 303 compares the most recent six bits from 30 bit register 505 to the most recent six bits from 30 bit register 509. If there are zero bit errors then a "confirmed DSAT detect" has occurred. A single phase DSAT detection scheme may then begin utilizing second leg 517. Microprocessor controller 303 will then calculate the smallest of the possible bit shifts between the received signal in 30 bit register 505 and 30 bit register 309. After 4.5 seconds of single phase no DSAT detect using first leg 313, microprocessor controller 303 will determine if a confirmed DSAT detection occurred during the interval by 24 bit register 301 and second leg 517 (utilizing the multiple phase method). A DSAT detection by second leg 517 may be an indication that a fraudulent call is being attempted. Microprocessor controller 303 will then calculate the time difference between the loss of supervision (DSAT or DST) by first leg 313 and the confirmed DSAT detect of 24 bit register 301 and second leg 517. Microprocessor controller 303 will then calculate the permitted bit shift by multiplying the time (in seconds) by 0.2. (current maximum allowable bit/phase shift per second). If the bit shift measured at the time of the confirmed detect is greater than the permitted bit shift, then it can be presumed that a fraudulent call is being attempted because, according to current NAMPS specifications, a legitimate mobile's signal could not have slipped further than the permitted bit shift. If no DSAT is detected by second leg 517, multiple phase detection will continue until either the DSAT is reacquired or a time threshold expires. If the time threshold expires, single phase detection using first leg 313 will be abandoned and multiple phase detection will be continued until DSAT is detected or a second time threshold expires. Of DSAT is reacquired, the actual bit shift will be compared to the permitted bit shift, and if the actual bit shift is greater, it can be presumed that a fraudulent call is being attempted.

Figure 6:
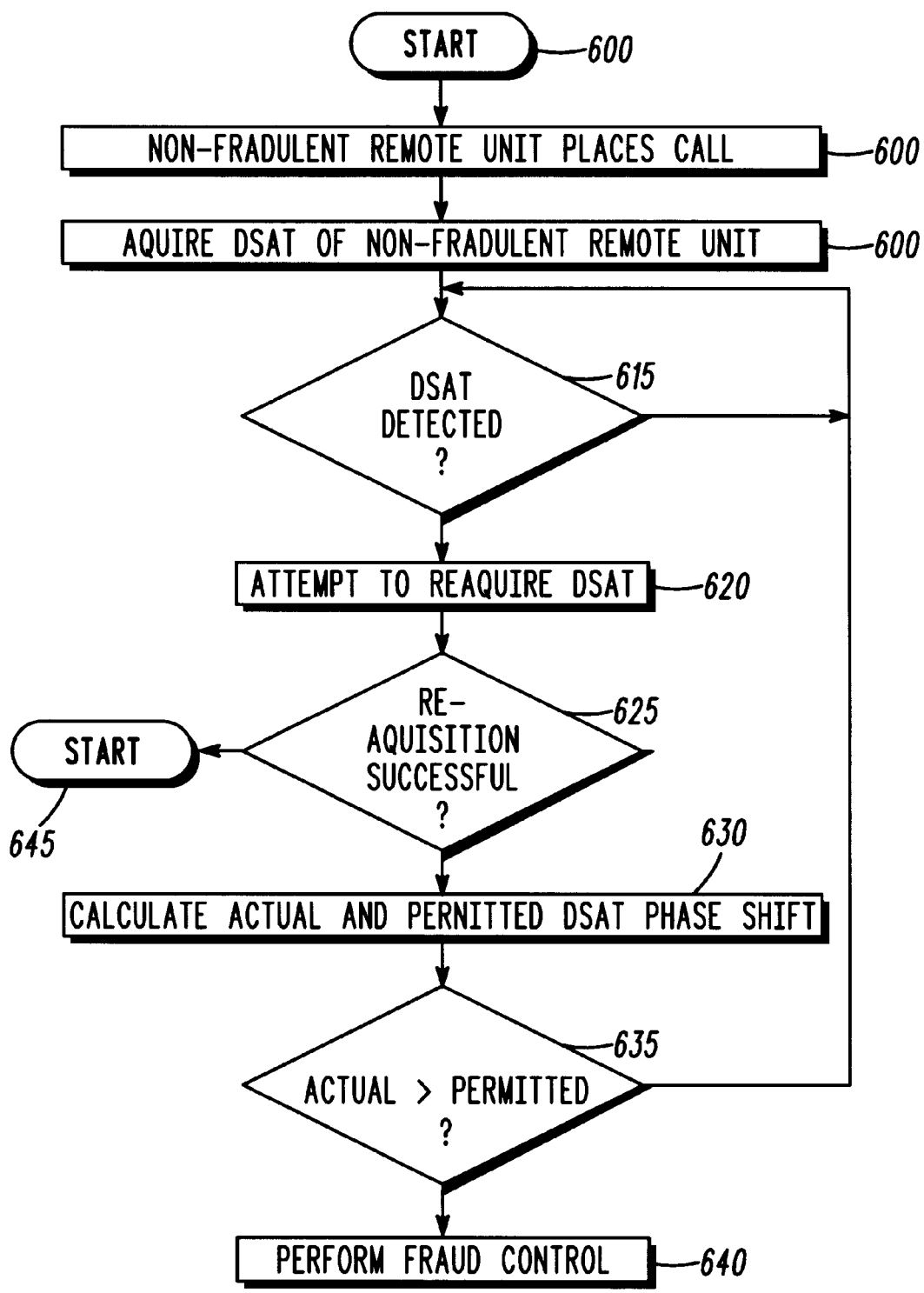
FIG. 6 is a flow chart detailing the operation of a base site controller of FIG. 1 in accordance with a preferred embodiment of the present invention.

FIG. 6 is a flow chart detailing the operation of a base site controller 116 of FIG. 1 in accordance with a preferred embodiment of the present invention. The logic flow begins at step 600. At step 605 a non-fraudulent remote unit places a call, and at step and microprocessor controller 303 acquires the DSAT of the non-fraudulent remote unit. This is accomplished (as discussed above) by concurrently utilizing a single phase DSAT detection scheme and a multiple phase DSAT detection scheme. Next at step 615 microprocessor controller 303 checks to see it multiple phase detection has given a "no detect" indication. If at step 615 microprocessor controller 303 determines that the DSAT is still acquired, the logic flow returns to step 615, otherwise, the logic flow continues at step 620 where microprocessor controller 303 attempts to re-acquire a DSAT or DST. Processing then continues to step 625 where microprocessor controller 303 checks to see if re-acquisition was successful. If at step 625 microprocessor controller 303 determines that re-acquisition was unsuccessful, then processing ends at step 645 and the call is terminated with an "loss of DSAT" indication. Otherwise, the logic flow continues to step 630 where microprocessor controller 303 calculates the actual and permitted sub-audible bit shifts (phase shift). In a preferred embodiment, the actual bit shift is calculated by determining a bit shift between the reacquired DSAT and the DSAT being transmitted prior to the loss of the DSAT, and a permitted bit shift is calculated multiplying the maximum allowable phase shift over time, by the time it took to re-acquire the DSAT transmission.

Continuing, at step 635 microprocessor controller 303 checks to see if the actual phase shift is greater than the permitted phase shift. If the result is negative, the logic flow continues to step 615. Otherwise, processing continues at 640 where appropriate fraud control measures are taken. Various measures may be taken. In a preferred embodiment the fraudulent call is terminated. In an alternate embodiment microprocessor controller 303 to sends a message indicating "hijack detected" to the infrastructure equipment, (preferably signal processing unit 121). Signal processing unit 121 may then disable the three party calling feature for the remainder of the call. Signal processing unit 121 may inform the cellular operator of the fraud, indicating the cell and frequency of the fraudulent call.

While the invention has been particularly shown and described with reference to a particular embodiment, it will be understood by those skilled in the art that various changes in form and details may be made therein without departing from the spirit and scope of the invention. For example, while the invention described above utilizes a DSAT phase shift for fraud detection, other phase shifts (both analog and digital) may be utilized as well. In addition fraud control on the reverse channel may be accomplished by utilizing the present invention with transmission of a DST. It is the intent of the inventor that various modifications can be made to the present invention without varying from the spirit and scope of the invention, and it is intended that all such modifications come within the scope of the following claims.

What is claimed is:

1. A method for detection of fraudulent users in a communication system, the method comprising the steps of:
   receiving a signal and producing a data stream from the signal, the data stream having a digital sequence therein;
   detecting a bit shift within the digital sequence to produce a detected bit shift;
   determining a permitted bit shift, wherein the step of determining the permitted bit shift comprises the step of multiplying a maximum allowable bit shift over time, by a time it takes to re-acquire a, digital transmission:
   comparing the detected bit shift to the permitted bit shift to produce a comparison; and
   performing fraud control based on the comparison.

2. The method of claim 1 wherein the step of receiving the signal comprises the step of receiving the signal on a signaling channel.

3. The method of claim 1 wherein the step of receiving the signal comprises the step of receiving the signal comprising a continuously transmitted Digital Supervisory Audio Tone (DSAT).

4. The method of claim 1 wherein the step of receiving the signal comprises the step of receiving the signal on a traffic channel.

5. The method of claim 1 wherein the step of detecting the bit shift comprises the step of comparing a Digital Supervisory Audio Tone (DSAT) transmitted from a first remote unit to a DSAT transmitted from a second remote unit and determining a bit shift between the first remote unit and the second remote unit.

6. The method of claim 1 wherein the step of performing fraud control comprises the step of sending a message indicating "hijack detected" to infrastructure equipment.

7. The method of claim 1 wherein the step of performing fraud control comprises the step of disabling a three party calling feature.

8. The method of claim 1 wherein the communication system comprises a Narrowband Advanced Mobile Phone Service (NAMPS) communication system.

9. A method for detection of fraudulent users in a communication system, the method comprising the steps of:
   receiving a digital sequence transmitted from a first remote unit on a first channel;
   receiving a digital sequence transmitted from a second remote unit on the first channel causing communication with the first remote unit to be discontinued;
   detecting a bit shift between the digital sequence transmitted from the first remote unit and the digital sequence transmitted from the second remote unit to produce a detected bit shift;
   determining a permitted bit shift, wherein the step of determining the permitted bit shift comprises the step of multiplying a maximum allowable bit shift over time, by a time it takes to re-acquire a digital transmission;
   comparing the detected bit shift to the permitted bit shift to produce a comparison; and
   performing fraud control on the second remote unit based on the comparison.

10. The method of claim 9 wherein the step of receiving the digital sequence transmitted from the first remote unit further comprises receiving the digital sequence transmitted from the first remote unit on a signaling channel.

11. The method of claim 9 wherein the step of receiving the digital sequence transmitted from the first remote unit comprises the step of receiving the digital sequence comprising a continuously transmitted Digital Supervisory Audio Tone (DSAT).

12. The method of claim 9 wherein the step of receiving the digital sequence transmitted from the first remote unit comprises the step of receiving the digital sequence transmitted from the first remote unit on a voice channel.

13. The method of claim 9 wherein the step of detecting the bit shift comprises the step of comparing a Digital Supervisory Audio Tone (DSAT) transmitted from the first remote unit to a DSAT transmitted from the second remote unit and determining a bit shift between the DSAT transmitted from the first and second remote units.

14. The method of claim 9 wherein the step of performing fraud control comprises the step of sending a message indicating "hijack detected" to infrastructure equipment.

15. The method of claim 9 wherein the step of performing fraud control comprises the step of disabling a three party calling feature.

16. The method of claim 9 wherein the communication system comprises a Narrowband Advanced Mobile Phone Service (NAMPS) communication system.

17. An apparatus for use in a communication system wherein communication to a user is temporarily lost and then re-acquired the communication system comprising:
   a transceiver for receiving a digital transmission having a digital sequence modulated thereon from a first remote unit on a first channel;
   a controller for detecting a bit shift in the digital sequence transmitted by the first remote unit and a second remote unit, said controller comparing the bit shift to a permitted bit shift, the permitted bit shift being determined by multiplying a maximum allowable bit shift over time, by a time it takes to re-acquired, the digital transmission, and performing fraud control based on the comparison.

18. The apparatus of claim 17 wherein the controller detects a bit shift by comparing a Digital Supervisory Audio Tone (DSAT) transmitted from the first remote unit to a DSAT transmitted from the second remote unit and determining a bit shift between the DSAT transmitted from the first and second remote units.

* * * * *